US009615676B2

(12) United States Patent
Clark et al.

(10) Patent No.: US 9,615,676 B2
(45) Date of Patent: Apr. 11, 2017

(54) PRODUCT DISPLAY CASE OR HOT PLATE DISPLAY CASE HAVING AN EDGE-MOUNTED LED ARRAY FOR ILLUMINATING A LIGHT PIPE FOR ILLUMINATING THE INTERIOR PORTION OF THE PRODUCT DISPLAY CASE OR HOT PLATE DISPLAY CASE, AND/OR AN EDGE MOUNTED LED ARRAY FOR ILLUMINATING A GLASS SHELF WITHIN THE PRODUCT DISPLAY CASE OR HOT PLATE DISPLAY CASE

(71) Applicants: Joseph R. Clark, Naperville, IL (US); Ted R. Mila, Bartlett, IL (US)

(72) Inventors: Joseph R. Clark, Naperville, IL (US); Ted R. Mila, Bartlett, IL (US)

(73) Assignee: A.J. ANTUNES & CO., Carol Stream, IL (US)

( * ) Notice: Subject to any disclaimer, the term of this patent is extended or adjusted under 35 U.S.C. 154(b) by 179 days.

(21) Appl. No.: 14/512,378

(22) Filed: Oct. 10, 2014

(65) Prior Publication Data
US 2016/0100698 A1  Apr. 14, 2016

(51) Int. Cl.
*F21V 7/04*  (2006.01)
*A47F 3/00*  (2006.01)
*F21V 8/00*  (2006.01)
*A47F 11/10*  (2006.01)

(52) U.S. Cl.
CPC ............. *A47F 3/001* (2013.01); *A47F 3/007* (2013.01); *A47F 11/10* (2013.01); *G02B 6/0068* (2013.01); *G02B 6/0091* (2013.01); *G02B 6/0095* (2013.01); *A47B 2220/0077* (2013.01); *G02B 6/0085* (2013.01)

(58) Field of Classification Search
CPC .......... A47F 3/001; A47F 3/007; A47F 11/10; G02B 6/0068; G02B 6/0091; G02B 6/0095; G02B 6/0085; A47B 2220/0077
USPC .................................................. 362/612, 92
See application file for complete search history.

(56) References Cited

U.S. PATENT DOCUMENTS 2,515,584  A    7/1950   Benson
7,163,305  B2   1/2007   Bienick
(Continued)

*Primary Examiner* — Andrew Coughlin
*Assistant Examiner* — Jessica M Apenteng
(74) *Attorney, Agent, or Firm* — Law Offices of Steven W. Weinrieb

(57) ABSTRACT

The present invention comprises a linear array of LEDs which can be utilized in conjunction with a product display case wherein the linear array of LEDs is operatively mounted upon, and disposed immediately adjacent to, a first end edge portion of a glass plate so as to effectively illuminate the glass plate by means of total internal reflection principles whereby the glass plate operatively serves as a light pipe such that the light emitted from a second opposite end edge portion of the glass light pipe can illuminate the interior portion of the product display case. Alternatively, the linear array of LED lights can be operatively mounted upon, and disposed immediately adjacent to, an edge portion of a glass shelf disposed within the product display case so as to likewise illuminate the glass shelf itself by means of total internal reflection principles whereby the illumination from the glass shelf serves to illuminate the products being displayed.

14 Claims, 6 Drawing Sheets

(56) References Cited

U.S. PATENT DOCUMENTS

| | | | |
|---|---|---|---|
| 7,588,340 B2 * | 9/2009 | Bauer | F21V 33/0044 |
| | | | 362/154 |
| 7,806,543 B2 | 10/2010 | Swofford et al. | |
| 7,845,818 B2 | 12/2010 | Shibusawa et al. | |
| 7,857,473 B2 * | 12/2010 | Shibusawa | A47F 3/001 |
| | | | 362/126 |
| 8,070,305 B2 | 12/2011 | Bratton | |
| 8,215,795 B2 | 7/2012 | Pichel | |
| 8,459,817 B2 | 6/2013 | Alberghetti et al. | |
| 2008/0278932 A1 * | 11/2008 | Tress | A47B 97/00 |
| | | | 362/133 |
| 2009/0021927 A1 | 1/2009 | Hall et al. | |
| 2009/0244884 A1 * | 10/2009 | Trulaske, Sr. | A47F 3/001 |
| | | | 362/94 |
| 2010/0097780 A1 * | 4/2010 | Beatenbough | A47F 3/001 |
| | | | 362/92 |
| 2011/0049121 A1 * | 3/2011 | Reinhard-Herrscher | F24C 7/082 |
| | | | 219/220 |
| 2012/0138590 A1 | 6/2012 | Brosnan et al. | |
| 2014/0247619 A1 | 9/2014 | Bennett et al. | |
| 2014/0292168 A1 * | 10/2014 | Nevarez | A47F 3/001 |
| | | | 312/236 |

* cited by examiner

PRODUCT DISPLAY CASE OR HOT PLATE DISPLAY CASE HAVING AN EDGE-MOUNTED LED ARRAY FOR ILLUMINATING A LIGHT PIPE FOR ILLUMINATING THE INTERIOR PORTION OF THE PRODUCT DISPLAY CASE OR HOT PLATE DISPLAY CASE, AND/OR AN EDGE MOUNTED LED ARRAY FOR ILLUMINATING A GLASS SHELF WITHIN THE PRODUCT DISPLAY CASE OR HOT PLATE DISPLAY CASE

STATEMENT REGARDING FEDERALLY SPONSORED RESEARCH OR DEVELOPMENT

Not Applicable

NAMES OF PARTIES TO JOINT RESEARCH AGREEMENT

Not Applicable

INCORPORATION BY REFERENCE OF MATERIAL SUBMITTED ON A COMPACT DISC

Not Applicable

FIELD OF THE INVENTION

The present invention relates generally to product display cases, more particularly to LED-illuminated light pipes, and even more particularly to an array of LEDs which can be utilized in conjunction with a product display case wherein the LED array is operatively mounted upon or disposed immediately adjacent to a first edge portion of a glass plate so as to effectively illuminate the glass plate, by means of total internal reflection principles, whereby the glass plate operatively serves as a light pipe such that the light emitted from a second opposite edge portion of the glass light pipe can illuminate the interior portion of the product display case. Alternatively, the array of LED lights can be operatively mounted upon or disposed immediately adjacent to an edge portion of a glass shelf, disposed within the product display case, so as to likewise illuminate the glass shelf by means of total internal reflection principles. The present invention is applicable to both heated product display cases or hot plate display cases.

BACKGROUND OF THE INVENTION

The illumination of both heated and unheated product display cases have, in the past, utilized one or more conventional light sources, such as, for example, incandescent bulbs, fluorescent lights, and halogen or quartz lamps. Although each one of these conventional light sources has obviously worked satisfactorily, is well-known, and have been in widespread use for many years, they are not truly desirable as light sources for present day usage for a variety of reasons. For example, none of these well-known light sources are energy efficient. In addition, the service life of each one of such conventional light sources is relatively short, thereby requiring replacement by service personnel. Incan-descent lights usually last for only 750-1200 hours, and are notoriously energy inefficient, effectively converting only approximately 5% of their energy into visible light. Fluorescent lights require the use of electrical ballasts for controlling or regulating the current flowing through the lights, and they also contain mercury, rendering them hazardous and requiring careful handling and disposal. They also only have a service life of only approximately 10,000 hours. Halogen or quartz lamps are relatively expensive, their costs resulting in expenditures which can be approximately four times that of a comparable incandescent bulb. In addition, quartz lamps are delicate and can be easily damaged. Special or careful handling of such lamps is therefore required, and still further, care must be taken not to permit oils from human skin to contaminate surface portions of quartz lamps in view of the fact that such contamination can lead to premature failure of the lamps. Halogen or quartz lamps also only have a service life of approximately 4,000-8,000 hours.

LED lights or lamps are also of course well-known and have been utilized within a multitude of environments. Their advantages comprise relatively long service life, such as, for example, between 50,000-100,000 hours, and they are extremely efficient in connection with their energy usage leading to substantially lower energy costs. One caveat to be aware of in connection with the usage of LED lights or lamps, however, resides in the fact that LED lights or lamps can only operate effectively within an ambient temperature range of, for example, approximately 40° F. to 130° F. Operation of LED lights or lamps with-in temperature environments of, for example, higher than 140° F. can lead to failure of the lights or lamps. Accordingly, if LED lights or lamps are to be used within unheated product display cases, the ambient temperature should not present any operational problems. However, if LED lights or lamps are to be utilized within heated product display cases, wherein the ambient temperatures are normally within the range of, for example, 165° to 180° F., such ambient environments could present operational drawbacks with respect to the utilization of LED lights or lamps within such environments. More particularly, if it is desired to use LED lights or lamps in connection with such heated product display cases, it is imperative that the temperature level at which the LED lights or lamps operate, or the temperature level of the environment within which the LED lights or lamps are expected to operate, or to which the LED lights or lamps are exposed, be maintained at a temperature which is definitely less than 140° F. while the ambient temperature within the heated product display case is optimally maintained at a temperature level of, for example, at least 165° F.

A need therefore exists in the art for a new and improved light source that can be utilized in connection with product display cases in order to illuminate the interior portions of the product display cases so as to properly display the products within a desirably illuminated environment, and wherein such light sources will not exhibit the operational drawbacks characteristic of conventional fluorescent, incandescent, or halogen or quartz lamps, as has been noted hereinbefore, while at the same time, such light sources will not be subjected to ambient or operational temperatures which would otherwise be operationally detrimental to the service life of such light sources.

SUMMARY OF THE INVENTION

The foregoing and other objectives are achieved in accordance with the teachings and principles of the present invention through the provision of a product display case having a linear array of LEDs operatively associated therewith wherein the linear array of LEDs is operatively mounted upon, and disposed immediately adjacent to, a first edge portion of a glass plate so as to effectively illuminate the glass plate, by means of total internal reflection principles, whereby the glass plate operatively serves as a light pipe such that the light emitted from a second opposite edge portion of the glass light pipe can illuminate the interior portion of the product display case. Alternatively, the linear array of LEDs can be operatively mounted upon, and disposed immediately adjacent to, an edge portion of a glass shelf, disposed within the product display case, so as to likewise illuminate the glass shelf by means of total internal reflection principles. More particularly, when the linear array of LEDs is utilized to illuminate the interior portion of the product display case, the linear array of LEDs is mounted within an end portion of an elongated metal frame or bracket structure, and the glass plate also has a first end portion thereof, comprising the first edge portion thereof, mounted within the elongated frame or bracket. The second opposite end or edge portion of the glass plate is then disposed immediately adjacent to one or more window structures defined within a portion of the overall framework of the product display case such that the light emitted by the linear array of LEDs, transmitted through the glass plate effectively defining a light pipe and emitted from the second opposite end or edge portion of the glass plate light pipe so as to project outwardly through the window structures of the product display case framework, can illuminate the interior portion of the product display case. The product display case is preferably a heated product display case, however, since the linear array of LEDs is effectively disposed externally of, and relatively remote from, the interior portion of the heated product display case, the LEDs are not exposed to the elevated temperature environment present within the heated product display case. As an optional alternative, a cooling fan may be operatively associated with the LEDs so as to ensure that the environment within which the LEDs are operating is in fact relatively cooler than that of the elevated temperature environment present within the heated product display case. In this manner, the effective service lives of the LEDs are not adversely affected.

Alternatively, the linear array of LEDs may be operatively mounted upon, and disposed immediately adjacent to, an edge portion of a glass shelf adapted to be disposed internally within a product display case. The glass shelf will likewise serve as a light pipe, as has been described hereinbefore, however, in this embodiment or use of the linear array of LEDs in conjunction with the glass shelf, the entire glass shelf is illuminated by means of total internal reflection principles. The glass shelf may be provided with, sandblasted, laser-engraved, etched, or other patterns thereon such that predetermined illuminated patterns or designs may be generated upon the illuminated glass shelf. Once again, the illuminated glass shelf is preferably used within a heated product display case, however, the rear portion of the heated product display case is open to the ambient atmosphere, and the linear array of LEDs is mounted upon the rear edge portion of the glass shelf. In this manner, the LEDs will again disposed within an environment which will be relatively cooler than the elevated temperature characteristic of the interior heated environment of the heated product display case so as to again ensure that the service life of the LEDs is not adversely affected. Still yet further, the mounting structure for the LEDs may be optionally provided with heat sink components so as to further ensure that the LEDs are not exposed to an elevated temperature environment.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

FIGURE I is a perspective view showing a heated product display case within which an LED illuminated light pipe can be utilized for illuminating the interior portion of the product display case in order to illuminate or highlight products to be displayed to customers or consumers.

DETAILED DESCRIPTION OF THE PREFERRED EMBODIMENT

Figure 1:
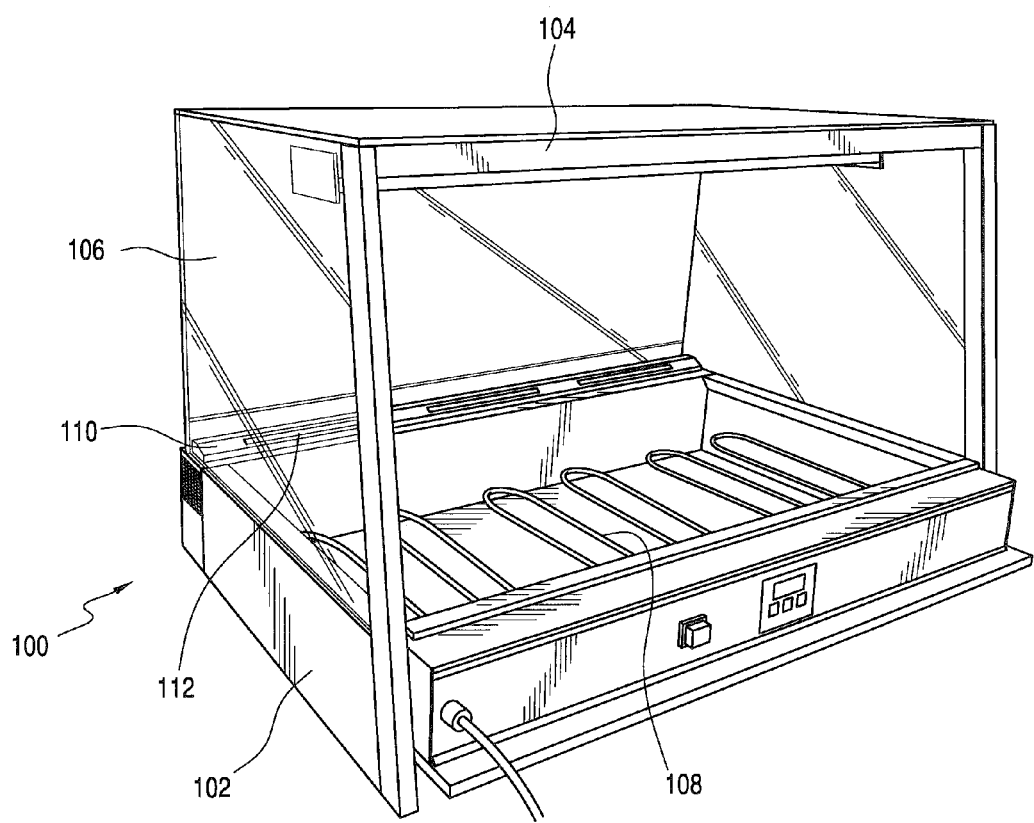

Referring now to the drawings, and more particularly to FIG. 1 thereof, there is shown a heated product display case, such as, for example, a product display case that would normally be employed within a commercial bakery or similar establishment for displaying muffins, breads, pastries, and the like, wherein the heated product display case is generally designated by means of the reference character 100. It is seen that the product display case 100 is conventionally constructed so as to comprise a metal frame base unit 102, and peripheral metal framework members 104 fixedly secured to the metal frame base unit 102 so as to support and secure therewithin suitable panes of glass 106 or other transparent material members through which customers or consumers can view the displayed products. It is also seen that suitable heating structure, in the form of heating coils 108, are mounted within the metal frame base unit 102 of the product display case 100, so as to provide the product display case 100 with its internally enclosed heated environment. It is of course to be understood that the heated product display case 100 will also have at least one glass shelf, and preferably a plurality of glass shelves, not shown, disposed therein upon which the particular products can be displayed for the customers or consumers to view. It is further seen, with additional reference being made to FIGS. 2 and 3, that the base unit 102 of the product display case 100 has a polygonally configured housing 110 fixedly secured upon the upper rear portion 111 thereof wherein the polygonally shaped housing 100 extends substantially the entire lateral width of the product display case 100. The polygonally shaped housing 110 is provided with a plurality of windows or openings 112 disposed at predeterminedly spaced positions along the lateral extent thereof, the purpose of which will be discussed shortly.

Figure 2:
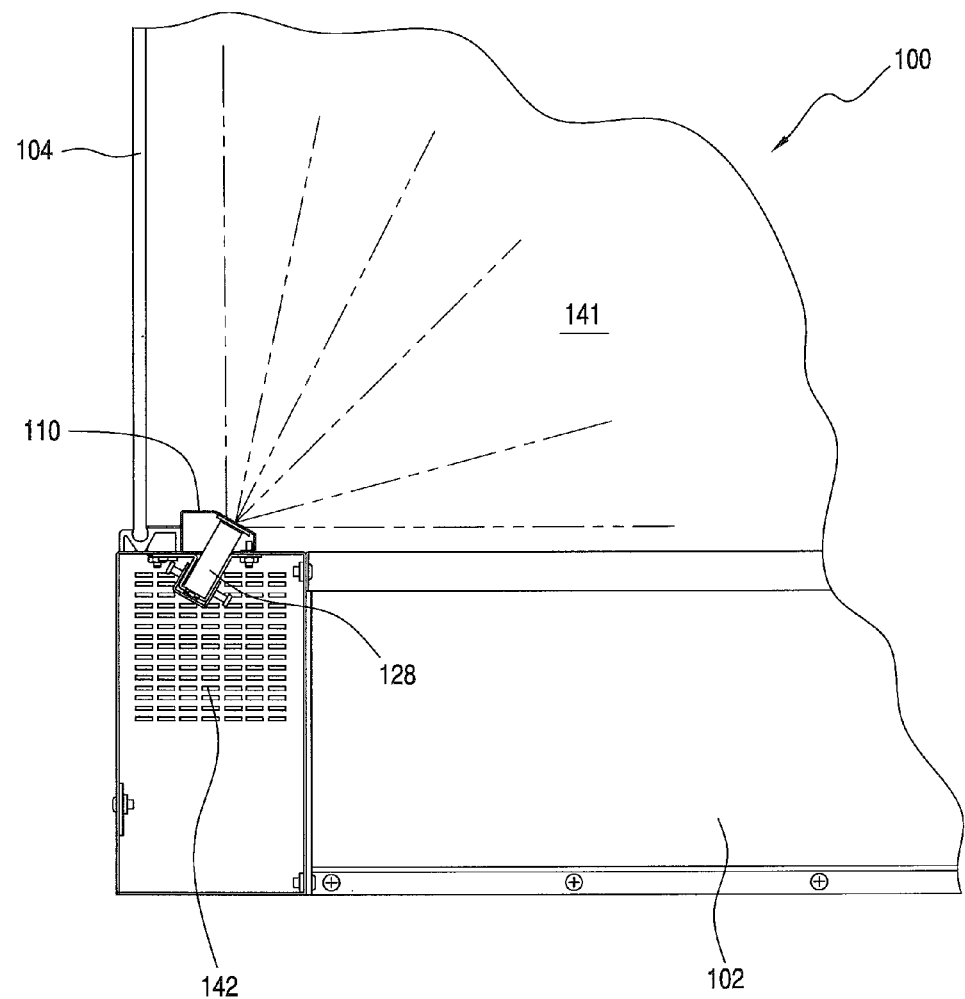
FIG. 2 is a partial schematic side elevational view of the heated product display case as illustrated within FIG. 1 showing the disposition of the LED illuminated light pipe as fixedly incorporated within a framework portion of the product display case so as to in fact provide illumination for the interior portion of the product display case.
Figure 3:
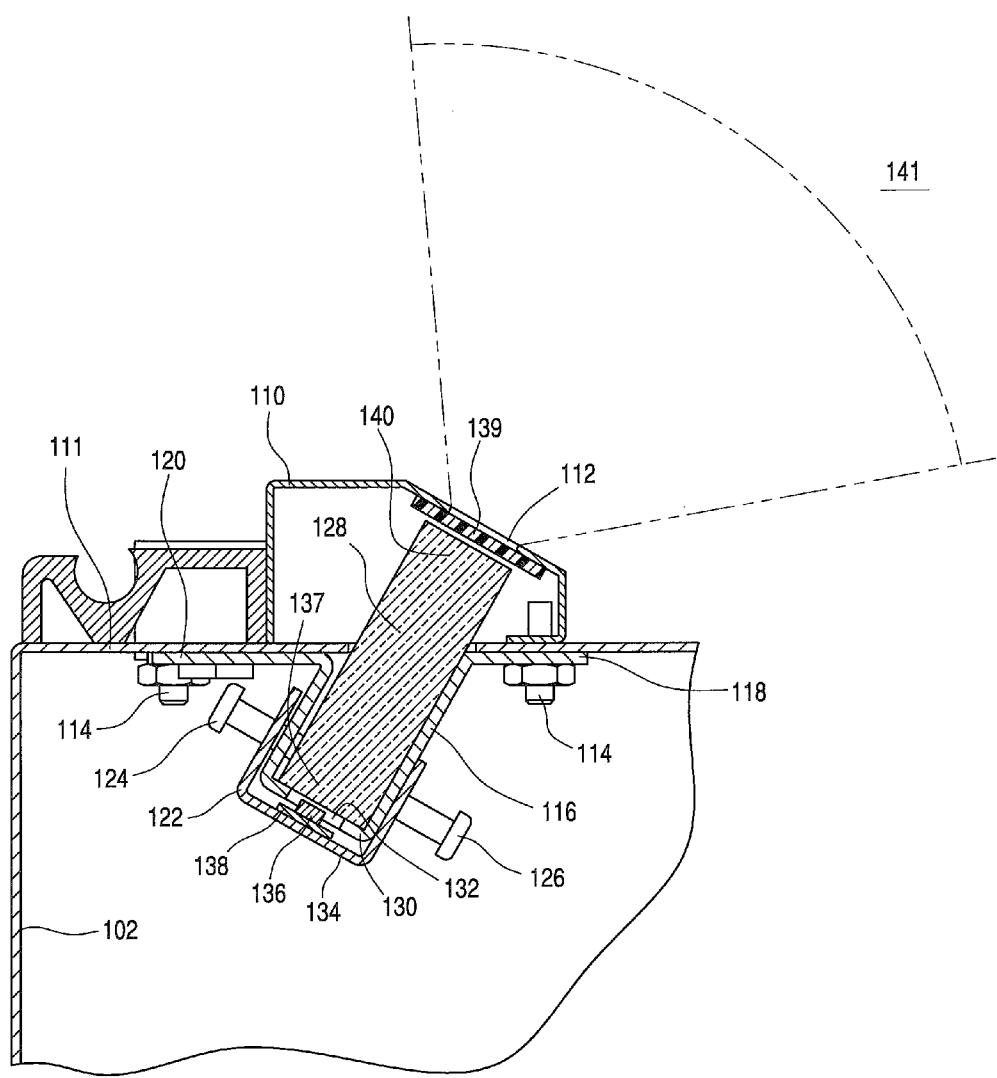
FIG. 3 is an enlarged side elevational view of FIG. 2 showing the details comprising the actual mounting of the linear array of LEDs disposed proximate a first end edge portion of the glass plate which effectively serves as the light pipe from which light will be emitted from a second opposite end edge portion of the glass plate so as to in fact illuminate the interior portion of the heated product display case.

With continued reference being made to FIGS. 2 and 3, it is seen that, as has been noted hereinbefore, the polygonally configured housing 110 is fixedly secured to an upper rear portion 111 of the base unit 102 of the product display case 100 by means of a plurality of suitable fastening bolts 114 or the like. In addition, a first mounting bracket, having a substantially inclined, U-shaped portion 116 and integral flanged portions 118,120, is likewise fixedly secured to the undersurface of the upper portion 111 of the base unit 102 by means of the fastening bolts 114. A second U-shaped mounting bracket 122 is adapted to be mounted upon and fixedly secured to the lower end portion of the first mounting bracket by means of a pair of oppositely disposed set screws 124,126. A glass plate 128, having the configuration of a rectangular parallelepiped, is adapted to have a first lower end edge portion thereof disposed within the inclined U-shaped portion 116 of the first mounting bracket whereby a first lower edge portion of the glass plate 128 will be seated upon the bottom wall portion 130 of the U-shaped portion 116 of the first mounting bracket. In addition, in order to fixedly retain or stabilize the disposition of the glass plate 128 within the U-shaped portion 116 of the first mounting bracket, as well as to facilitate the mounting of the second mounting bracket 122 upon the U-shaped portion 116 of the first mounting bracket, it is to be further appreciated from FIG. 3 that a pair of aligned threaded apertures, not visible, are defined within the oppositely disposed upstanding portions of the second mounting bracket 122, and a pair of aligned throughbores, also not visible, are defined within oppositely disposed side wall portions of the U-shaped portion 116 of the first mounting bracket. In this manner, the set screws 124,126 can properly be inserted within and through the apertures and holes of the first and second mounting brackets so as to engage opposite faces of the glass plate 128. Still further, it is also seen that the bottom wall portion 130 of the U-shaped portion 116 of the first mounting bracket has an elongated hole or aperture 132 defined therein, and that the bottom wall portion 130 of the U-shaped portion 116 of the first mounting bracket is vertically spaced from the bottom wall portion 134 of the second mounting bracket 122.

In practice, it is to be further appreciated that due to the elongate lateral extent of the product display case 100, the housing 110 will have a lateral extent substantially equal to that of the product display case 100 as will the lateral extents of the first and second mounting brackets 116,122. It can therefore be appreciated that pairs of the set screws 124,126 will be disposed at predetermined positions along the entire lateral extent of the first and second mounting brackets 116,122 so as to fixedly secure the second mounting bracket 122 to the first mounting bracket 116 as well as to fixedly secured the glass plate 128 within the first mounting bracket 116 in a stabilized manner. Continuing further, it is also seen from FIG. 3 that an elongated linear array of LEDs 136 is fixedly mounted upon the bottom wall portion 134 of the second mounting bracket 122 by means of, for example, a suitable adhesive-backed mounting strip 138, and that the linear array of LEDs 136 are partially disposed within the elongated hole or aperture 132 defined within the U-shaped portion 116 of the first mounting bracket. In this manner, the linear array of LEDs 136 are disposed immediately adjacent to the first lower end edge portion 137 of the glass plate 128 such that light, emitted from the linear array of LEDs 136, can pass through the first lower end edge portion of the glass plate 128 and travel or propagate through the glass plate 128 in accordance with total internal reflection principles. The glass plate 128 therefore effectively serves as a light pipe whereby the light will be emitted or escape from the second opposite end edge portion 140 of the glass plate light pipe 128. It will be appreciated from FIG. 3 that the second opposite end edge portion 140 of the glass light pipe 128 is disposed immediately adjacent to the plurality of windows 112 defined within the polygonally shaped housing 110, and in this manner, it can be further appreciated that such light can in fact be utilized to illuminate substantially the entire interior portion of the product display case 100. It is to be noted that a lens cover 139, which may be fabricated from a clear polycarbonate or similar thermoplastic material, is secured to the underside of that portion of the housing 110 within which the windows 112 are defined. It is to be lastly appreciated that, in accordance with additional principles and teachings of this heated product display case 100, the disposition of the linear array of LEDs 136 is located outside of, or relatively remote from, the enclosed heated interior environment 141 of the product display case 100. Accordingly, the linear array of LEDs 136 can be maintained relatively cool, and within their optimal operating temperature range, as opposed to being exposed to the elevated temperatures present within the heated product display case 100. However, if such linear array of LEDs 136 requires additional cooling so as to ensure their disposition within a relatively cool environment for optimal performance and service life, a cooling fan unit 142 can be readily incorporated within the main frame base unit 102 as may be seen in FIG. 2 so as to provide cooling air within the immediate ambient environment within which the linear array of LEDs 136 is disposed.

Figure 4:
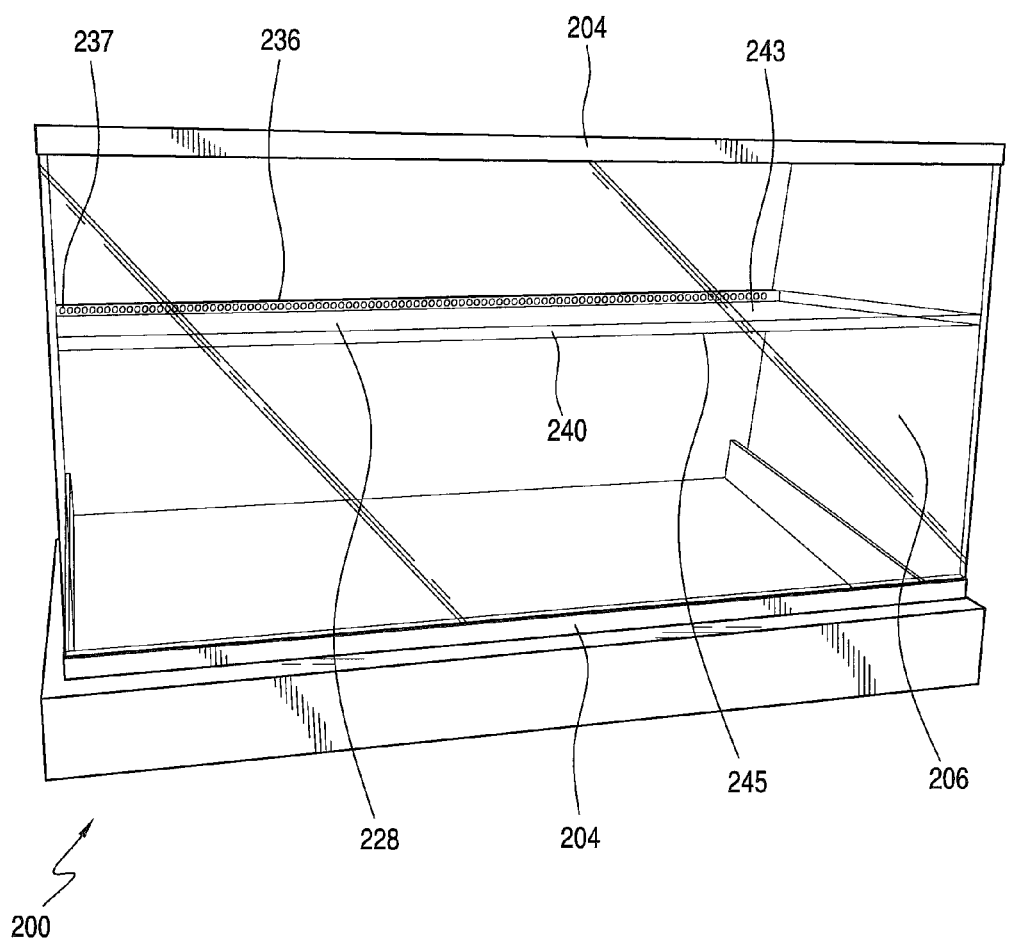
FIG. 4 is front elevational/perspective view of a heated product display case, similar to that illustrated within FIG. 1, showing the disposition of, for example, an illuminated glass shelf disposed within the heated product display case whereby the entire glass shelf, effectively serving as a light pipe, has light emitted from its upper, lower, and distal edge surface portions.
Figure 5:
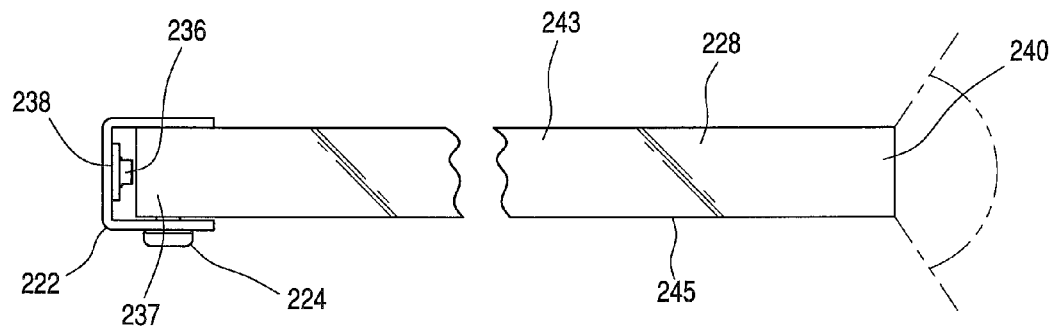
FIG. 5 is a schematic side elevational view of a first embodiment of a glass plate or shelf which has a linear array of LEDs operatively mounted upon an aluminum bracket such that the LEDs are disposed immediately proximate a first edge end portion of the glass plate or shelf such that the entire glass plate serves as a light pipe from which light is emitted whereby the glass plate can serve as an illuminated glass shelf when disposed internally within a product display case, such as that illustrated within FIG. 4, so as to illuminate consumer products disposed and displayed upon the glass shelf.

With reference now being made to FIG. 4, there is illustrated a second heated product display case which may be similar to the heated product display case 100 as illustrated within FIG. 1, however, this heated product display case is in fact different, as will be noted shortly hereinafter, and has been generally indicated by the reference character 200. It is to be noted that component parts of the second heated product display case 200, which correspond to component parts of the first heated product display case 100, will be denoted by means of corresponding reference characters, where possible, except that the reference characters for the second heated product display case 200 will be within the 200 series. Accordingly, it can be seen that the second heated product display case 200 is seen to comprise a base unit 202, a metal framework 204, and product display case glass panes or panels 206. In addition, a glass product display shelf 228 is shown mounted within the product display case 200, although a larger number of shelves may be disposed within the product display case 200, and it is also seen that a linear array of LEDs 236 are fixedly mounted upon a rear end edge portion of the glass shelf 228. With reference additionally being made to FIG. 5, a first embodiment of a glass plate or shelf, which can serve as the glass product display shelf 228, is illustrated as having a linear array of LEDs 236 operatively mounted upon a first end edge portion of the glass product display shelf 228. More particularly, it is seen that the structural components used for mounting the linear array of LEDs onto the first end edge portion of the glass product display shelf 228 is similar to that employed in connection with mounting the glass plate or light pipe 128 within the assembly disclosed within FIG. 3 in that an aluminum bracket 222 is fixedly secured to the first end edge portion of the glass plate or shelf 228 by means of at least one set screw 224. The linear array of LEDs 236 are mounted upon an adhesive-backed mounting strip 238, and the adhesive-backed mounting strip 238 is, in turn, secured to the end wall portion 234 of the mounting bracket 222. Accordingly, as was the case with the LEDs 136 in use in conjunction with the glass plate light pipe 128, the linear array of LEDs 236 is disposed immediately adjacent or proximate to the first edge end portion of the glass plate or shelf 228. It is additionally noted that glass plate or shelf 228 also comprises upper and lower surface portions 243,245. Accordingly, the entire glass plate or shelf 228 serves as a light pipe from which light is emitted from the upper surface portion 243, the lower surface portion 245, and the second end edge portion 240, such that the entire glass plate or shelf effectively glows and can serve as an illuminated glass shelf when disposed internally within the product display case 200 so as to illuminate consumer products disposed and displayed upon the glass shelf 228.

Figure 6:
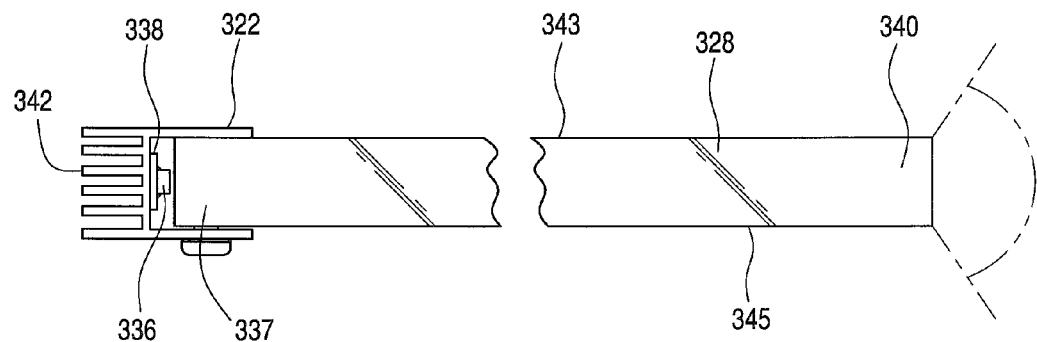
FIG. 6 is a schematic side elevational view of a second embodiment of a glass plate or shelf, similar to that illustrated within FIG. 4, showing, however, the optional employment of a finned heat sink integrally formed upon the aluminum mounting bracket, to which the linear array of LEDs is attached, so as to ensure that the temperature level present within the ambient environment immediately surrounding the linear array of LEDs is maintained sufficiently low so as not to adversely affect the operational service life of the LEDs.

As is often the case with heated product display cases, the rear portion of the product display case, that is, that portion which is accessible by the commercial establishment personnel, is usually open to the ambient atmosphere. This permits the personnel to readily reach in and grasp particular products that consumers have selected to buy while looking through, for example, the front glass panel of the product display case, to also permit personnel to readily assist the consumer in selecting particular products that they may want, or alternatively, to permit the personnel to restock the product display case with additional products for sale. Accordingly, it can be appreciated that since the linear array of LEDs 236 is effectively mounted upon the end edge portion of the glass plate or shelf 228 that is disposed within the ambient atmosphere, the linear array of LEDs 236 will normally be disposed within an ambient atmosphere whose temperature is significantly below that of the heated interior of the product display case. In this manner, the linear array of LEDs 236 will not normally be exposed to elevated temperature levels. However, if additional assurance is desired in order to ensure that the linear array of LEDs 236 will in fact operate within a cooler environment so as not to be adversely affected by elevated temperature levels, then additional cooling structure may be employed in conjunction with the linear array of LEDs. One such type of cooling structure is disclosed, for example, within FIG. 6, in conjunction with a second embodiment of the glass shelf 328 wherein it is seen that the mounting bracket 222, of FIG. 5, has effectively been modified such that the resulting mounting bracket 322 has finned heat sink structure 342 integrally incorporated thereon, wherein the plurality of heat sink fins project rearwardly or in the opposite direction away from the glass shelf 328.

Figure 7:
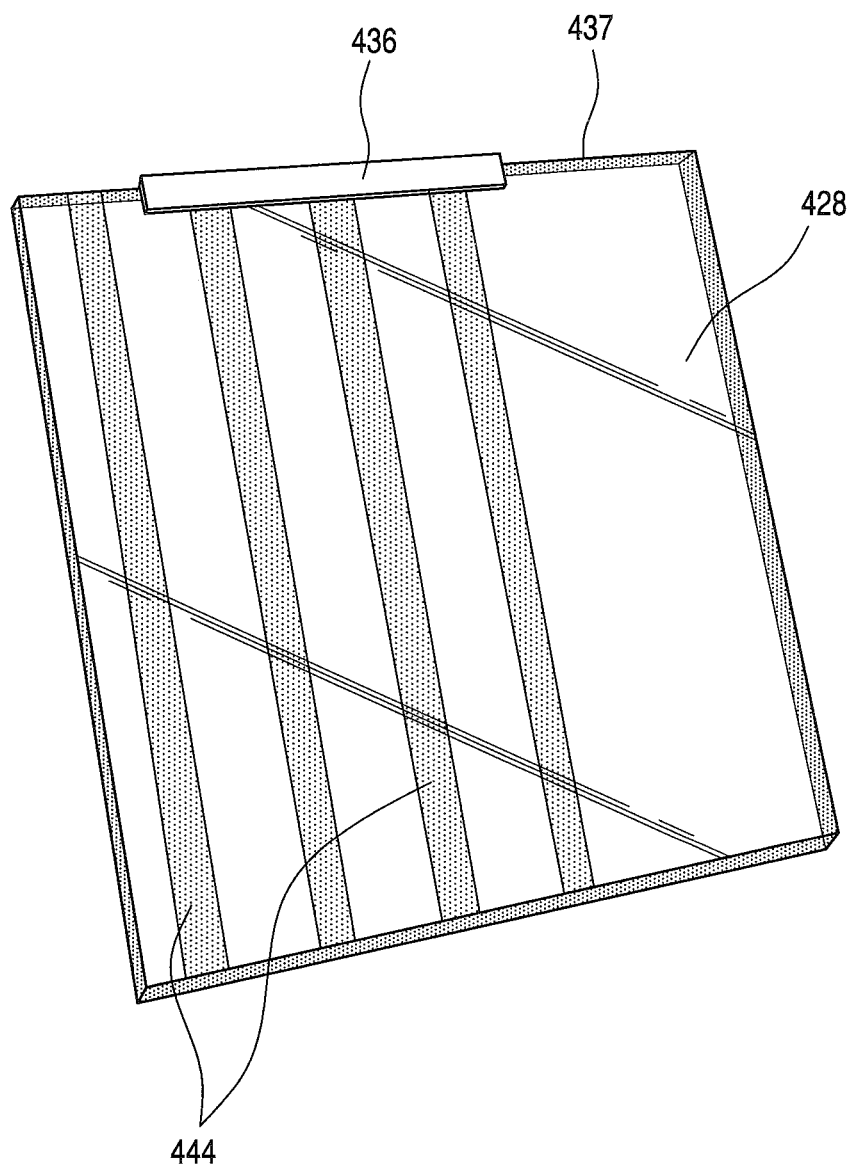
FIG. 7 is a top plan view of an illuminated glass plate, similar to that illustrated within FIG. 1, showing, however, a glass plate which has, for example, undergone a sandblasting treatment so as to effectively form a pattern, comprising a plurality of lines, within the glass plate, wherein the plurality of lines become visible when illuminated by means of the linear array of LEDs.

It is to be further noted that in accordance with the principles and teachings of the present invention, various other embodiments or variations of the disclosed glass shelves or light pipes, and the use of the linear arrays of LEDs in conjunction therewith, are possible in order to achieve different illumination patterns or effects. For example, while the linear array of LEDs may comprise the use of warm or bright white LEDs, other colored LEDs are possible, such as, for example, blue, red, amber, green, and yellow LEDs. In a similar manner, various surface edge treatment processes can be operatively used in conjunction with the glass plate or sheet so as to likewise achieve various different lighting or illumination effects. For example, acid etching, sandblasting, ground and polishing techniques, water jet cutting, flame rolling, and pencil ground operations can be utilized. An example of a sandblasted glass sheet or plate 428 is illustrated within FIG. 7 wherein the sandblasted lines 444 are visible after being illuminated by means of the linear array of LEDs. Still further, soda lime, tempered, and borosilicate glass, as examples, can be employed. Likewise, and still further, polycarbonate, acrylic, and/or any other suitable transparent material can be utilized as the glass shelf or light pipe as has been disclosed hereinabove. All of these different colors, glass treatment methods, and the like can be utilized in order to provide different lighting or illumination effects to the glass shelf or light pipe, as may be desired by a particular commercial establishment. Still further, a company logo, for example, may even be imparted onto, for example, the glass shelf and illuminated accordingly in an outstanding glowing manner.

Thus, it may be seen that in accordance with the teachings and principles of the present invention, there has been disclosed a product display case having a linear array of LEDs operatively used in conjunction therewith wherein the linear array of LEDs is operatively mounted upon, and disposed immediately adjacent to, a first end edge portion of a glass plate so as to effectively illuminate the glass plate, by means of total internal reflection principles, whereby the glass plate operatively serves as a light pipe such that the light emitted from a second opposite end edge portion of the glass light pipe can illuminate the interior portion of the product display case. Alternatively, the linear array of LED lights can be operatively mounted upon, and disposed immediately adjacent to, an edge portion of a glass shelf, disposed within the product display case, so as to likewise illuminate the glass shelf itself, by means of total internal reflection principles, whereby the illumination from the glass shelf serves to illuminate the products being displayed.

Obviously, many variations and modifications of the present invention are possible in light of the above teachings. It is therefore to be understood that within the scope of the appended claims, the present invention may be practiced otherwise than as specifically described herein.

NUMBER KEY GUIDE

100—heated product display case of FIG. 1
102—base unit of product display case
104—metal framework of product display case 106—glass panes of product display case
108—heating coils of product display case
110—housing
111—upper portion of base unit 102
112—windows in 110
114—bolts for securing 110 to top of 102
116—inclined U-shaped portion of first mounting bracket
118,120—flanged portions of first mounting bracket
122—second U-shaped bracket
124,126—set screws to secure second bracket 122 to first mounting bracket
128—glass plate
130—bottom wall portion of 116
132—hole or aperture in bottom wall portion 130
134—bottom wall portion of second mounting bracket 122
136—linear array of LEDs
137—first end edge portion of 128
138—adhesive-backed mounting strip for mounting LEDs on 134
139—lens cover for windows 112
140—second opposite end edge portion of 128
141—interior heated environment portion of product display case
142—cooling fan
200—heated product display case of FIG. 4
202—base of product display case 200
204—metal framework of product display case 200
222—mounting bracket attached to 228
224—set screw
228—glass shelf of product display case 200
234—end wall portion of bracket 222
236—linear array of LEDs mounted upon glass shelf 228
237—first end edge portion 228
238—adhesive-backed mounting strip
243—upper surface portion of 228
245—lower surface portion of 228
328—glass shelf
337—first end edge portion of 328
342—finned heat sink structure
343—upper surface portion of 228
345—lower surface portion of 228
428—sandblasted glass sheet or plat
444—sandblasted lines on 428

What is claimed as new and desired to be protected by Letters Patent of the United States of America, is:

1. A heated product display case, comprising:
a framework defining a substantially enclosed heated environment within which products are displayed for viewing by consumers, said framework defining said substantially enclosed environment comprising a front viewing region, opposite side regions, a rear wall region disposed opposite said front viewing region, a housing connected to said framework, and at least one window defined within said housing;
a glass plate, having a first end edge portion and a second opposite end edge portion, disposed internally within said housing and operatively connected to said framework defining said substantially enclosed heated environment so as to be disposed externally of said substantially enclosed heated environment defined within said product display case; and
a linear array of LEDs, disposed adjacent to said first end edge portion of said glass plate for transmitting light into said first end edge portion of said glass plate such that the light will be transmitted through said glass plate by means of total internal reflection principles and exit from said second opposite end edge portion of said glass plate which is disposed internally within said housing so as not to protect outwardly from said housing and into said substantially enclosed heated environment whereby said glass plate effectively comprises a light pipe for illuminating substantially the entire enclosed heated environment of said product display case as a result of light, from said light pipe, passing through said at least one window.

2. The display case as set forth in claim 1, wherein:
said product display case has a predetermined lateral extent;
said housing has a predetermined lateral extent substantially the same as said predetermined lateral extent of said product display case;
said glass plate has a configuration which is that of a rectangular parallelepiped which has a lateral extent substantially the same as said predetermined lateral extent of said framework; and
said at least one window, defined within said housing, for permitting said light, emitted from said second opposite end edge portion of said glass plate light pipe, to illuminate said substantially entire enclosed heated environment of said product display case has a predetermined lateral extent which is substantially the same as said predetermined lateral extent of said housing and said glass plate.

3. The display case as set forth in claim 2, wherein:
said at least one window defined within said housing comprises a plurality of windows defined within said housing and spaced along said housing at predetermined locations along said predetermined lateral extent of said housing.

4. The display case as set forth in claim 1, further comprising:
heating structure disposed within said framework of said product display case for rendering said product display case a heated product display case.

5. The display case as set forth in claim 4, further comprising:
cooling structure disposed within said framework of said heated product display case at a position relatively close to said linear array of LEDs for effectively cooling said linear array of LEDs so as to ensure that said linear array of LEDs is operatively disposed within a relatively cool operating environment relative to said substantially enclosed heated environment of said heated product display case.

6. The display case set forth in claim 1, wherein:
said linear array of LEDs comprise colored LEDs which may be selected from the group comprising warm white, bright white, red, green, blue, yellow, and amber.

7. The display case set forth in claim 1, wherein:
said glass plate may be fabricated from a material selected from the group comprising soda lime glass, tempered glass, borosilicate glass, polycarbonate, and acrylic materials.

8. A heated product display case, comprising:
a framework defining a substantially enclosed internal environment within which products are displayed within said product display case for viewing by consumers;
heating structure disposed within said framework of said product display case for providing heat to said substantially enclosed internal environment of said product display case such that said product display case comprises a heated product display case;

at least one glass shelf, having an upper surface portion, a lower surface portion disposed opposite said upper surface portion, a first end edge portion disposed perpendicular to said upper and lower surface portions, and a second end edge portion disposed opposite said first end edge portion and also disposed perpendicular to said upper and lower surface portions, disposed within said product display case for supporting products, to be displayed to consumers, thereon; and a linear array of LEDs, disposed adjacent to said first end edge portion of said glass shelf for transmitting light into said first end edge portion of said glass shelf such that said light will be transmitted through said glass shelf by means of total internal reflection principles whereby said glass shelf effectively comprises a light pipe from which light will be emitted from said upper and lower surface portions of said glass shelf, as well as from said second opposite end edge portion of said glass shelf, for illuminating products disposed upon said shelf disposed within said heated product display case.

9. The display case as set forth in claim 8, wherein:
said linear array of LEDs is mounted upon said first end edge portion of said at least one glass shelf by a substantially U-shaped mounting bracket.

10. The display case as set forth in claim 9, wherein:
said display case is open to the ambient atmosphere at one side thereof so as to permit service personnel ready access to said substantially enclosed heated internal environment of said display case; and
said linear array of LEDs is mounted upon said first end edge portion of said at least one glass shelf so as to be disposed externally of said substantially enclosed heated internal environment of said display case such that said linear array of LEDs is operative within an environment which is substantially cooler than that of said substantially enclosed heated internal environment of said display case.

11. The display case as set forth in claim 10, wherein:
said mounting bracket mounting said linear array of LEDs adjacent to said first end edge portion of said at least one glass shelf is provided with heat sink structure for further ensuring that said linear array of LEDs is operative within an environment which is substantially cooler than that of said substantially enclosed heated internal environment of said display case.

12. The display case set forth in claim 8, wherein:
said linear array of LEDs comprise colored LEDs which may be selected from the group comprising warm white, bright white, red, green, blue, yellow, and amber.

13. The display case as set forth in claim 8, wherein:
said glass plate may be fabricated from a material selected from the group comprising soda lime glass, tempered glass, borosilicate glass, polycarbonate, and acrylic materials.

14. The display case as set forth in claim 8, wherein:
said at least one glass shelf may have various designs, logos, or the like formed thereon by means of a glass treatment process selected from the group comprising acid etching, sandblasting, ground and polishing techniques, water jet cutting, flame rolling, and pencil ground operations.

* * * * *